United States Patent

Gries et al.

Patent Number: 5,345,750
Date of Patent: Sep. 13, 1994

[54] APPARATUS FOR SUPPLYING AND SEALING FLAT ARTICLES

[75] Inventors: Manfred Gries, Karlsruhe; Roland Klein, Remchingen-Darmsbach, both of Fed. Rep. of Germany

[73] Assignee: PVT Piepenbrock Verpackungstechnik GmbH, Osnabruck, Fed. Rep. of Germany

[21] Appl. No.: 8,671

[22] Filed: Jan. 22, 1993

[30] Foreign Application Priority Data

Feb. 6, 1992 [DE] Fed. Rep. of Germany ....... 4203435

[51] Int. Cl.$^5$ .......................... B65B 9/02; B65B 51/16
[52] U.S. Cl. ........................................ 53/553; 53/546; 53/374.4
[58] Field of Search .................... 53/373.5, 374.4, 546, 53/550, 553, 554, 555, 389.4

[56] References Cited

U.S. PATENT DOCUMENTS

| | | |
|---|---|---|
| 2,447,258 | 8/1948 | Lobley . |
| 3,030,747 | 4/1962 | Karpowicz ........................ 53/553 X |
| 3,140,572 | 7/1964 | Petersen et al. . |
| 3,538,675 | 11/1970 | Schmitz ................................. 53/550 |
| 4,106,265 | 8/1978 | Aterianus ............................... 53/550 |
| 4,244,158 | 1/1981 | Nelham . |

FOREIGN PATENT DOCUMENTS 489526 1/1953 Canada .................................. 53/553

Primary Examiner—Linda B. Johnson
Attorney, Agent, or Firm—Nixon & Vanderhye

[57] ABSTRACT

An apparatus for supplying flat, disc-like articles, such as pharmaceutical compacts and similarly configured technical small parts, in particular tablets (1), and for sealing the articles in hot-sealing sheet (5, 105) comprises a conveyor for supplying the articles and two hot-sealing rollers (30, 130), one of which is arranged on either side of a conveying path (3). A hot-sealing sheet (5, 105), is supplied from each roller so that the rollers receive the articles in seal wells (32, 132) between the hot-sealing sheets and seal the articles between the sheets. A finger roller (10) for positioning the articles is arranged on the conveying path (3) in front of the hot-sealing rollers (30, 130). Between the finger roller (10) and the hot-sealing rollers (30, 130) on both sides of the conveying path (3) there is a respective polygonal roller (20, 120) for geometrical constrained guiding and separating of the articles. The cross-section of the polygonal rollers (20, 120) can have the form of a triangle which is rounded at the corners (26, 126) and at the side faces. The axes of all the rollers lie parallel to each other and parallel to the conveying plane but at right angles to the conveying path (3). The finger roller (10), the polygonal rollers (20, 120) and the hot-sealing rollers (30, 130) are arranged in series in such a manner that the supplying, positioning, separating, sealing and carrying away of the articles take place in a horizontal plane.

7 Claims, 3 Drawing Sheets

APPARATUS FOR SUPPLYING AND SEALING FLAT ARTICLES

The invention relates to an apparatus for supplying and sealing flat articles between sealing sheets.

In packaging machines, the articles, for example tablets after leaving the tablet press, are supplied via conveying and supplying means to a sealing station. There they are individually sealed between endless strips of hot-sealing sheet or foil. Thereafter, the sheet strips with the tablets sealed therein are conveyed for separating (longitudinal and transverse cutting) into small package units and for subsequent stacking and cartoning.

In known packaging machines the individual articles, for example tablets from the tablet press, are conveyed to the sealing station in several paths adjacent each other obliquely upwardly in close succession and contacting each other. After passing a deflecting means and release by a finger roller, the tablets are allowed to drop in free fall vertically between two hot-sealing tools, over which from both sides a hot-sealing foil is supplied. The tablets are sealed between these foils or sheets.

After passing the deflecting means the individual tablets pile up in a vertical line in front of the finger roller, the fingers of which engage into the intermediate spaces between two tablets lying adjacent each other in the row. By rotation of the roller individual tablets are released for free dropping out of the tablet stack lying vertically in the pile-up. The release must be controlled in such a manner that in each case the tablets drop exactly into the region between two mold depressions (seal wells) of the two hot-sealing tools so that they can be individually sealed between the two sheets supplied from the outside via the tools.

The dropping speed of the tablets depends primarily on gravity but also on the mass and shape of the tablets (air resistance when falling). The revolving speed of the sealing rollers and thus the conveying speed of the two sealing sheets must accordingly be adapted to the dropping speed of the tablets. The cycle of the release of the tablets must be synchronized via the revolving speed of the finger roller with the revolving speed of the sealing rollers. If even only slight changes of the desired speed of one of these components occurs there is a danger of the tablets coming between the sheets too early or too late and thus not exactly into the centre of the mold depressions. This would result in useless packages, or at least the tablets with their edges could press through or mark the edges of the sealed package. In the extreme case where the finger roller and the hot-sealing rollers run completely out of phase, the tablets would not drop between the mold depressions but between the sealing regions of the sealing rollers and would therefore be crushed by the latter.

After the sealing and the longitudinal and transverse cutting of the sheet strips, the tablets are again deflected out of the vertical guide path, through more than 90° into an obliquely upwardly extending path for subsequent stacking and cartoning. Thus, between the tablet press and the carton packaging the tablets undergo several deflections, in some cases with and in some cases without the sealing cover, and as a result abrasion and breakage can occur.

Moreover, in the known machines the tablets must be raised from the predetermined outlet height of the tablet press (about 900 mm) by obliquely upwardly running conveying means up to the finger roller for positioning for free fall. After the sealing the tablets in the sheet or foil strips are raised by obliquely upwardly running conveyor means to the predetermined height of the machine for the further packaging. This double raising of the tablets results in a large overall length and height of the total apparatus.

The problem underlying the invention is therefore to obtain an exact positioning of the tablets in the sealed packages, the conveying of the tablets taking place as gently as possible. The overall length and height of the machine is moreover to be kept as small as possible. The invention solves the problems described above.

By means of two so-called polygonal rollers between the finger roller and the hot-sealing rollers the tablets are exactly positioned and supplied to the hot-sealing rollers. The finger, polygonal and hot-sealing rollers are arranged in succession in such a manner that the supplying, positioning, separating, sealing and carrying away of the tablets take place in a horizontal plane. By the form geometry of the polygonal rollers a constrained guiding and thus a reliable positioning of the tablets in the seal wells is obtained irrespective of the dropping acceleration and the mass of the tablets. In addition, a multiple deflection of the tablets is avoided and thus the stressing of the tablets between the tablet press and cartoning minimized, achieving at the same time a smaller overall size of the total machine.

The supply apparatus according to the invention is generally suitable for substantially flat, rounded, disc-shaped articles, in particular however for tablets.

An example of embodiment of the invention will be described in detail hereinafter with the aid of the schematic drawings.

Figure 1:
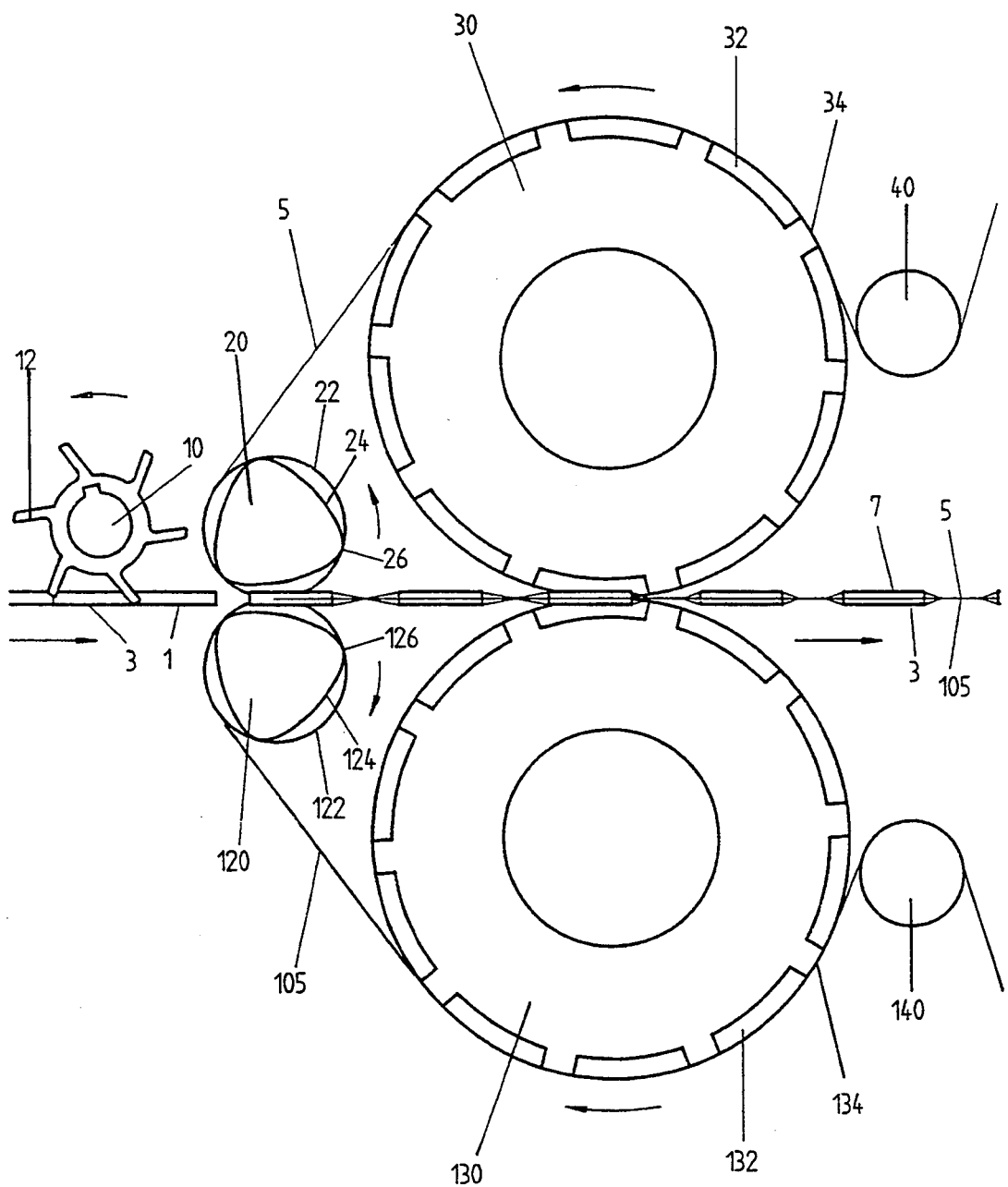
FIG. 1 is a longitudinal section through a supplying and sealing apparatus according to the invention, comprising finger roller, polygonal rollers and hot-sealing rollers, in a first position.
Figure 2:
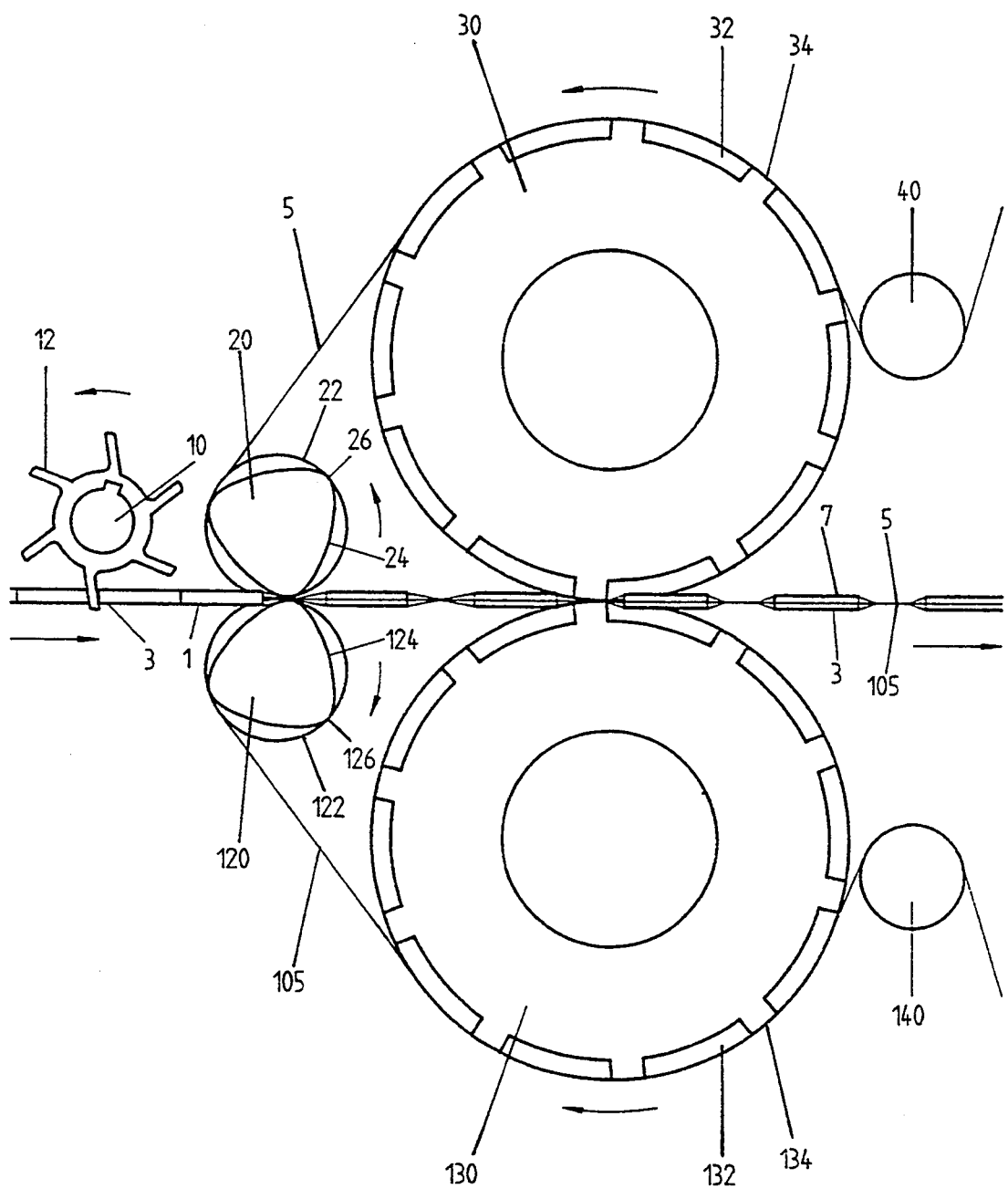
FIG. 2 is a longitudinal section through the same apparatus in a second position.

Arranged in series in the supplying and sealing apparatus, above and below a horizontal conveying path 3 for tablets 1, are essentially a finger roller 10, two polygonal rollers 20, 120 and two hot-sealing rollers 30, 130 (FIGS. 1 and 2). The tablets 1 coming from the tablet press pass through the supplying and sealing apparatus in that they are supplied to the two hot-sealing rollers 30, 130 on the conveying path 3 by means of the finger roller 10 and the two polygonal rollers 20, 120.

Figure 3:
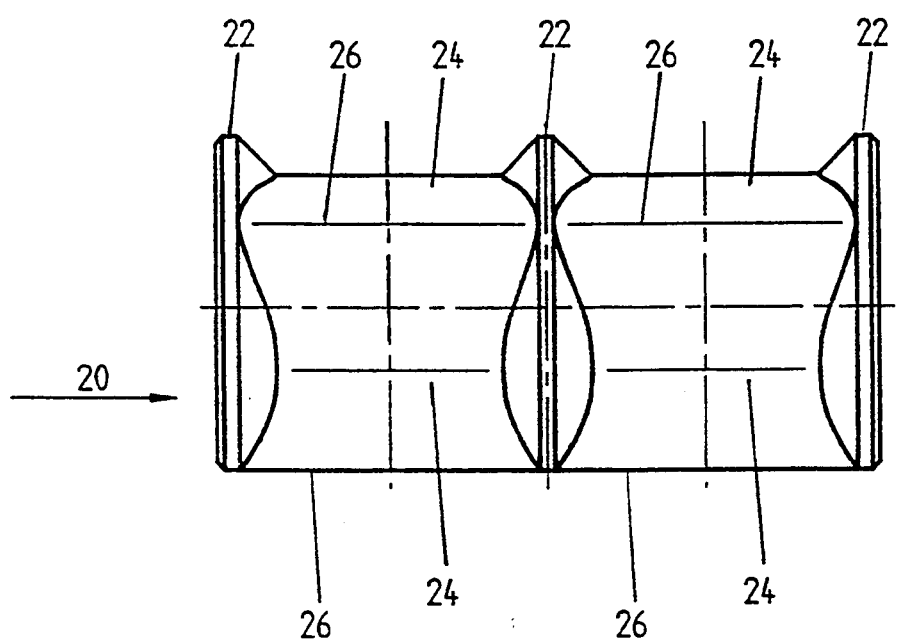
FIG. 3 is a plan view of a polygonal roller for a two-path tablet supply.

The finger roller 10 has fingers 12 which project at the periphery of the roller, are inclined at identical angles and are arranged with the same length. They serve to engage between the tablets 1 arranged in series and bearing on each other, the fingers 12 being arranged axially in such a manner that every two fingers engage a tablet. The polygonal rollers 20, 120 have a polygonal cross-section and preferably a rounded triangular cross-section (FIGS. 1 to 3). In addition, they have coaxial cylindrical sheet guide regions 22, 122 which define the tablet cavities 24, 124 on the polygonal rollers 20, 120. The hot-sealing rollers 30, 130 have depressions, the so-called seal wells 32, 132, in which the tablets 1 are received whilst hot-sealing sheet 5, supplied from above via guide means 40 is sealed by the sealing regions 34, 134 with hot-sealing sheet 105 supplied from below via guide means 140.

The finger roller 10 serves to position the tablets 1 in the pile-up which is generated for example by a conveying belt arranged in front of the finger roller 10. A respective finger of the finger roller 10 engages into the cavity generated by the round form of the tablets between abutting tablets 1 and positions the tablets lying therebehind in the pile-up until engagement by the hot-sealing sheets 5, 105 in the draw-in region of the polygonal rollers 20, 120 by which the tablets are separated and transported with the higher peripheral speed corresponding to the package length. The tablets 1 thus separated are therefore passed with higher speed between the two polygonal rollers 20, 120 which are arranged above each other and bearing on each other and which are interposed before the two hot-sealing rollers 30, 130 likewise arranged one above the other and bearing on each other. The axes of all the rotating members (finger roller 10, polygonal rollers 20, 120, hot-sealing rollers 30, 130) lie parallel to each other, parallel to the conveying plane and perpendicular to the conveying path 3 of the tablets 1.

Over each of the outer surfaces of the hot-sealing rollers 30, 130 an endless strip of hot-sealing sheet 5, 105 is supplied and firstly reaches the outer surfaces of the polygonal rollers 20, 120. The sheets 5, 105 are deflected over the polygonal rollers 20, 120 between the latter into the conveying path 3 in the conveying direction. The tablets 1 in the pile-up are inserted by the finger roller 10 between the sheets 5, 105 between the polygonal rollers 20, 120.

To guide the sealing sheets 5, 105 each polygonal roller 20, 120 has at least two cylindrical guide regions 22, 122 coaxial with the roller and having a smooth surface, which form the lateral boundary of the tablet cavities 24, 124. Thus, with one tablet cavity 24, 124 the roller 20, 120 has a cylindrical sheet guide region 22, 122 at each end; with two tablet cavities it has a cylindrical sheet guide region (FIG. 3) at each end and in the centre of the roller. Analogously, several tablet cavities 24, 124 may be arranged adjacent each other. The two rollers 20, 120 are in contact at said sheet guide regions 22, 122 and consequently the hot-sealing sheets 5, 105 are pressed against each other there so as to adhere together, the subsequent sealing thereby being prepared. The sealing sheet 5, 105 is moreover guided on the radially outwardly disposed corners or edges 26, 126 of the polygonal cross-sections. Thus, altogether a uniform guiding of the sealing sheets 5, 105 is ensured without distortion over the polygonal rollers 20, 120. The conveying of the sealing sheets 5, 105 and thus the tension thereon is effected only by the hot-sealing rollers 30, 130 and not by the polygonal rollers 20, 120, this being brought about by a roughened profile of the sealing regions 34, 134 of the hot-sealing rollers 30, 130.

The individual tablets 1 are clamped between the hot-sealing sheets 5, 105 in the regions between the polygonal rollers 20, 120 where the latter have reduced diameter. As a result, the sheet portions come to bear in the portions of the polygonal rollers 20, 120 with reduced diameter to prepare the subsequent introduction into the seal wells 32, 132 of the hot-sealing rollers 30, 130.

The polygonal rollers 20, 120 preferably have a rounded triangular cross-section in the polygonal region. This gives advantageous angles for the clamping of the tablets, and in particular short distances are possible between the finger roller 10 and the hot-sealing rollers 30, 130 on either side of the polygonal rollers 20, 120. However, polygonal rollers 20, 120 with other polygonal rounded cross-sections are also conceivable.

By the tension on the hot-sealing sheets 5, 105 due to the hot-sealing rollers 30, 130 the tablet 1 is pulled with the sheets 5, 105 through the polygonal rollers 20, 120 synchronously to the rotation thereof. The rotation of the polygonal rollers 20, 120 is such that between two spaced consecutive tablets 1 the rounded corners or edges 26, 126 of the polygon contact each other. As a result, the two sealing foils 5, 105 extending between the polygonal rollers 20, 120 contact each other here as well and remain adhering on each other, although they are not yet sealed together.

The rounding of the edges 26, 126 of the polygons in the peripheral direction is expedient in order to avoid any pressure points or dents in the sheet 5, 105. A rounding or bevelling is also expedient laterally in the axial direction of the roller at the transition from the polygonal regions of the cavities 24, 124 to the cylindrical guide regions 22, 122 in order not to stress or even damage the sheets 5, 105 by sharp edges.

The hot-sealing sheets 5, 105 arriving via the unused sides of the hot-sealing rollers 30, 130 are preheated by the latter before they run over the polygonal rollers 20, 120 which themselves are heated thereby. The heating of the sheets and the polygonal rollers 20, 120 permits the adhering of the sheets 5, 105 together. The tablets are fixed all round by this initial fusing in the foil web by means of the sheet guide regions 22, 122 and the edges 26, 126 of the polygonal rollers 20, 120. The actual sealing operation does not however take place until between the hot-sealing rollers 30, 130, being effected in known manner by the mutual engagement of the sealing regions 34, 134 extending axially on the periphery of the rollers and in the peripheral direction between the seal wells 32, 132.

Following the hot-sealing rollers 30, 130 the sealed tablets 1 are further processed in known manner: The adjacently disposed tablet strips are cut into proper sized longitudinal and transverse strips in order to be further conveyed for example by a conveyor for cartoning.

The essence of the supplying and sealing apparatus according to the invention is that the tablets are gently treated, i.e. not subjected to any stress.

The finger, polygonal and hot-sealing rollers 10; 20, 120; 30, 130 are arranged in series in such a manner that the supplying, positioning, separating, sealing and carrying away of the tablets 1 takes place in a horizontal plane on the horizontal conveying path 3. This ensures a harmonious passage of the loose and sealed tablets 1, 7 through the sealing apparatus. No upward or downward conveying of the tablets is necessary and nor are any deflections of the tablets required, at the most only slight vertical differences being necessary. The free fall as supply to the hot-sealing rollers is eliminated. The result is a compact overall size of the entire packaging machine. The exit of the tablet press, the supply means to the hot-sealing rollers 30, 130, these rollers themselves and the following (known) processing devices may lie substantially in a horizontal plane. The finished packages (output) need no longer be deflected either. They already have the correct vertical position with respect to a further conveyor and can therefore be simply handled. Altogether, a better visual control of all the function groups of the entire apparatus is therefore possible by one standing operator. Finally, this also makes it possible to achieve a better optical design of the apparatus.

With the known type of packaging with free fall different positions of the individual tablets in the seal wells of the hot-sealing rollers occurred in dependence upon the speeds of the rollers and the mass and acceleration of the tablets under gravity. Due to the geometric constrained control, according to the invention, a uniform position of the tablets is always obtained within the seal wells 32, 132. Due to the synchronization of the rotations of all the rollers with each other, the tablets are permanently guided in constrained manner and can never perform their own independent free movement. The finger roller 10 always supplies one tablet 1 to the polygonal rollers 20, 120 adapted to the instantaneous position thereof. By said rollers the tablet 1 is prepositioned between the sealing sheet webs 5, 105. This gives an exact position in the seal wells 32, 132 of the hot-sealing rollers 30, 130. This therefore minimizes the danger of useless packages, whether due to tablets 1 incorrectly positioned in the seal wells 32, 132 or crushed by the sealing regions 34, 134 between the seal wells 32, 132.

Heating of the tablets when the machine is stationary or is running is avoided because the feeding of the tablets is not from above against the ascending hot stream. Due to the horizontal supply, the tablets also remain cool when the machine is stationary. The supply components of the machine prior to the sealing are also no longer heated. Moreover, dust and abrasion from the tablets and evaporating sheet coating ascending with the hot air stream can no longer contaminate the upper machine components. A resinification or gumming of such components is thus not possible. This saves cleaning work on the supply components. Altogether, the operating capacity of the machine can be better utilized because technically induced stoppage times are avoided.

Via the circulating hot-sealing sheets 5, 105 the heat of the heated hot-sealing rollers 30, 130 also heats up the polygonal rollers 20, 120, which themselves are not heated. As a result, the sheets 5, 105 with their heated sealing adhesive are contacted in the region of the cylindrical sheet guide regions 22, 122 and the rounded edges 26, 126 of the polygonal rollers 20, 120 and as a result the sheets 5, 105 are stuck together between the polygonal rollers 20, 120. Consequently, no heat loss occurs and the heat power present is used more efficiently than hitherto.

A further advantage of the invention is that due to the geometric constrained control of the tablet supply and the sheet supply by the polygonal roller 20, 120 high outputs can be achieved which can be continuously infinitely varied whilst the machine is running. For example, the running rate may be variably adjusted between 120 and 500 cycles per minute. The tablets always have the same position and subsequent adjustment is not necessary. Thus, from every row of a multi-row machine up to 500 tablets per minute in the packaged state can be output. Due to this variable rate control during running operation adaptation to speed variations in the tablet supply and/or the tablet processing up to cartoning are possible. Thus, altogether a higher efficiency and higher output are achieved.

We claim:

1. Apparatus for supplying and sealing articles between hot sealed sheets, comprising:

conveying means for supplying articles in close succession to one another in at least one line along a conveyor path;

a hot sealing tool including two hot sealing rollers having heating means and depressions forming sealing wells, said rollers arranged parallel to one another, bearing against each other and having axes perpendicular to the conveying path of the articles, one roller being arranged above and another roller being arranged below said conveying path, a sealing sheet being fed and preheated about at least a portion of each roller outside said conveying path;

a finger roller disposed along the conveying path upstream of said hot sealing rollers for positioning the articles, the finger roller having an axis lying parallel to the axes of the hot sealing rollers;

two rollers each having a polygonal cross-section for geometrical constrained guiding, positioning and separating of the articles, the polygonal rollers bearing on each other and a respective one of them being arranged above and below the conveying path downstream of the finger roller and upstream of the hot sealing rollers, each of said polygonal rollers being arranged to receive a preheated sealing sheet from a respective hot sealing roller and to supply said sealing sheet to said respective hot sealing roller so that the hot sealing rollers receive the articles between said depressions and between said sealing sheets;

said hot sealing rollers, polygonal rollers and finger roller lying parallel to one another;

the conveying means, the finger roller, the polygonal rollers and the hot sealing rollers being arranged in a conveying direction seriatim such that the supplying, positioning, separating, and sealing of the articles takes place along a horizontal path; and means for heating the sealing sheets about said sealing rollers, the polygonal rollers having outer surfaces receiving on their upstream side said preheated sealing sheets from said hot sealing rollers, the polygonal rollers deflecting the heated sealing sheets into the conveying path in the conveying direction between the polygonal rollers and the hot sealing rollers, the hot sealing rollers heating the sealing sheets between the rollers and sealing the articles between the sheets.

2. Apparatus according to claim 1 wherein a cross-section of each polygonal roller is substantially in the form of a triangle.

3. Apparatus according to claim 1 wherein the cross-section of each polygonal roller has edges and side faces and is rounded at the edges and at the side faces.

4. Apparatus according to claim 2 wherein the cross-section of each polygonal roller has edges and side faces and is rounded at the edges and at the side faces.

5. Apparatus according to claim 1 wherein each of the polygonal rollers has at least two coaxial cylindrical guide regions for the hot sealing sheets and which form lateral boundaries for articles cavities on the polygonal rollers.

6. Apparatus according to claim 5 wherein the cylindrical sheet guide regions merge via beveled or rounded surfaces into the polygonal cross-section of the respective rollers.

7. Apparatus according to claim 1 wherein the article is peripherally fixed between the sheets by initial sealing along the polygonal rollers.

* * * * *